(12) United States Patent
Fittante et al.

(10) Patent No.: US 10,308,084 B2
(45) Date of Patent: Jun. 4, 2019

(54) DEVICE TO INCREASE THE GRIP OF THE TYRES

(71) Applicants: Fittante S. Brevetti & Innovazione S.r.l., Florence (IT); Aldo Fittante, Florence (IT)

(72) Inventors: Aldo Fittante, Florence (IT); Ivano Benedetti, Calenzano (IT)

(73) Assignee: Fittante S. Brevetti & Innovazione S.r.l., Florence (IT)

(*) Notice: Subject to any disclaimer, the term of this patent is extended or adjusted under 35 U.S.C. 154(b) by 193 days.

(21) Appl. No.: 15/109,109

(22) PCT Filed: Dec. 29, 2014

(86) PCT No.: PCT/IB2014/002893
§ 371 (c)(1),
(2) Date: Jun. 29, 2016

(87) PCT Pub. No.: WO2015/101825
PCT Pub. Date: Jul. 9, 2015

(65) Prior Publication Data
US 2016/0325583 A1 Nov. 10, 2016

(30) Foreign Application Priority Data

Jan. 2, 2014 (IT) .................. FI2014A0001
Aug. 7, 2014 (IT) .................. FI2014A0187

(51) Int. Cl.
*B60C 27/04* (2006.01)
*B60B 15/26* (2006.01)
*B60B 15/24* (2006.01)

(52) U.S. Cl.
CPC .......... *B60C 27/045* (2013.01); *B60B 15/266* (2013.01); *B60B 15/24* (2013.01)

(58) Field of Classification Search
CPC .......... B60C 27/00; B60C 27/02; B60C 27/04; B60C 27/045
See application file for complete search history.

(56) References Cited

U.S. PATENT DOCUMENTS 2,456,438 A   12/1948 Miller et al.
3,847,196 A * 11/1974 Gomez ............... B60C 27/045
                                                152/226

(Continued)

OTHER PUBLICATIONS

Int'l Search Report and Written Opinion, PCT/IB2014/002893, dated Apr. 10, 2015.

(Continued)

*Primary Examiner* — Jason R Bellinger
(74) *Attorney, Agent, or Firm* — Nancy J. Flint, Attorney at Law, P.A.; Nancy J. Flint, Esq.

(57) ABSTRACT

A device to increase the grip of the tread of the wheel of a vehicle is disclosed. A base is secured to the outside of the face of the rim of a wheel, and a plurality of moving spokes whose ends are connected to claws are elastically connected to each other to form a belt whose diameter progressively increases during its positioning. The moving spokes cause the belt to switch from a retracted rest configuration having the shape of an annulus, in which the claws are arranged inside the perimeter of the base (2), to a configuration that make its extension progressively increase around the tread, wherein the claws contact a roadbed.

13 Claims, 10 Drawing Sheets

(56) References Cited

U.S. PATENT DOCUMENTS

| | | | |
|---|---|---|---|
| 5,540,267 A | 7/1996 | Rona | |
| 6,341,635 B1* | 1/2002 | Robeson | B60B 15/266 |
| | | | 152/210 |
| 2006/0096683 A1* | 5/2006 | Kahen | B60B 15/18 |
| | | | 152/216 |
| 2009/0056848 A1* | 3/2009 | Maltezos | B60B 15/22 |
| | | | 152/216 |
| 2010/0276046 A1 | 11/2010 | Maltezos | |

OTHER PUBLICATIONS

Int'l Preliminary Report on Patentability, PCT/IB2014/002893, dated Mar. 21, 2016.

PCT/IB2014/002893, Replacement Sheets Article 34, dated Oct. 9, 2015.

* cited by examiner

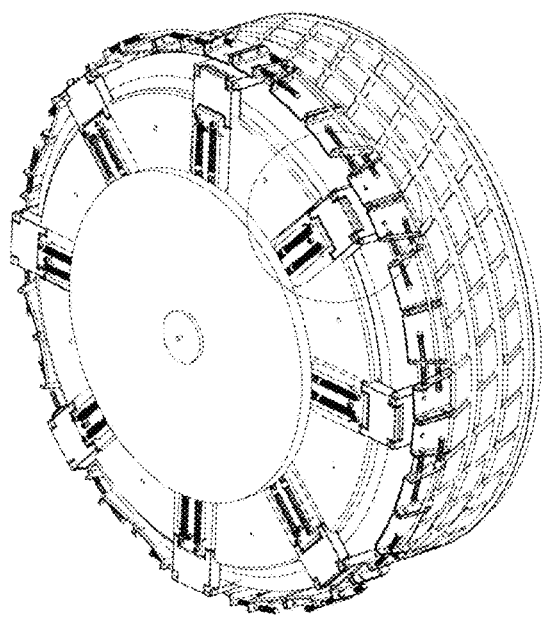
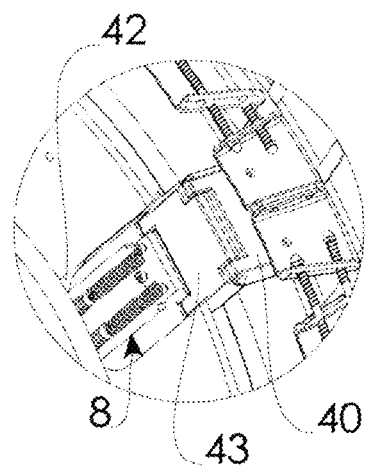
FIG. 7A　　　　　FIG. 7B
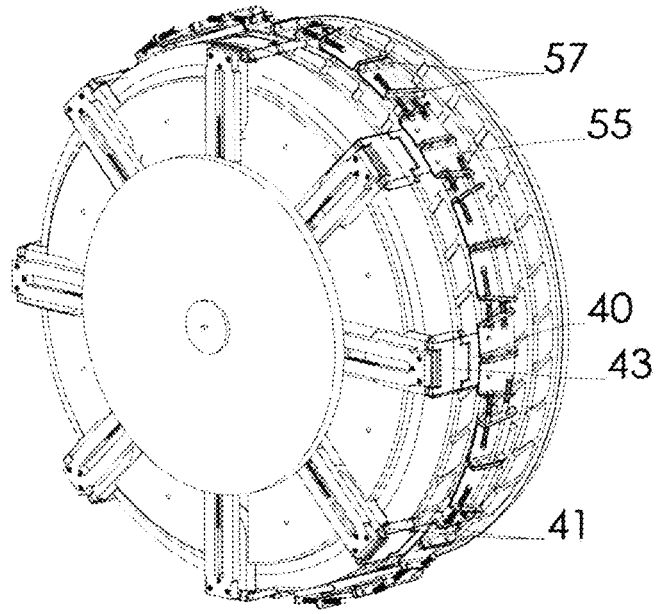
FIG. 8

DEVICE TO INCREASE THE GRIP OF THE TYRES

TECHNICAL FIELD

The present invention refers to a device to increase the grip of tyres of vehicles. The subject device can be advantageously used on those soils which do not offer a sufficient degree of grip like, for instance, iced-up or snow-covered roadbeds, or roadbeds covered by sand or gravel.

This device can be used for being equipped in cars, trucks, dump trucks, buses, etc.

The present invention, in particular, aims at freeing car drivers from the need for having at their disposal so called winter or snow tyres, snow chains or other similar means, which require skill and time to be mounted whenever they have to go along sections of roads that are iced up or covered by snow or in any case not capable of guaranteeing a sufficient grip.

STATE OF THE ART

The devices known so far are basically of two types, on one hand the family of the traditional snow chains, with different types of links and fastening methods, and on the other hand devices secured to the rim of the wheel and provided with radial extensions that extend up to folding back onto the outer face of the tyre.

However, both solutions are characterized in that they are to be mounted in the moment when the vehicle has to face up to slippery roadbeds, to be subsequently removed as soon as the vehicle comes back to move on roads in good gripping conditions.

A number of devices, mainly of radial types, have been set up, which are mounted permanently on the driving wheels of vehicles and that, thanks to a remote control, possibly of an automatic type, can switch from a rest position to a work position and vice-versa; examples of automatically operated devices are disclosed in U.S. Pat. No. 5,540,267 and in DE 19813588.

These automatic devices, owing to their radial structure, present a problem in that they are not capable of covering the tread continuously along all the outer circumference of the tyre. Also, these devices are subjected to damages or breakages caused by some moving elements getting stuck while they are activated or deactivated.

The problem of offering a continuous contact has been faced up to by DE 19800748, which proposes to join the work ends of the radial elements by trapezoidal link chains; however, the latter represent in any way strongly discontinuous elements with respect to the ends joined by them, so that different elements, for instance sections of chain and ends of radial arms, alternate along the outer circumference of the tyre.

By the way, in this solution the movement is a complex combination of radial and axial translatory motions.

PURPOSES AND SUMMARY OF THE INVENTION

Therefore, the purpose of the present invention is to provide an anti-slipping device for tyres, of a type to be permanently installed at least on the driving wheels and to be operated and collapsed upon command, possibly via automatic mechanisms controlled by sensors; said device simultaneously imparting to the tread a totally continuous contact with the roadbed.

This result has been achieved having adopted the idea of implementing a device comprising a plurality of composite moving spokes, whose ends are equipped with specifically developed gripping members or claws; said composite moving spokes are tangentially linked to each other by an at least partially elastic annular belt and are operationally associated with positioning means that cater for their radial displacement.

The further features that will be described below enable the device according to the present patent application to overcome the drawbacks described for the present state of the art.

This invention concerns a device to increase the grip of tyres, of a type applicable to a driving wheel which comprises a rim provided with an inner face, an outer face, and a channel for accommodating a tyre, the latter featuring an inner side and an outer side, with an intermediate tread.

In its most general embodiment, the device according to the present patent application comprises: a base (2), associated with a face of the rim of the wheel; a plurality of composite moving spokes, whose outer or end segments (40) are connected to each other by a partially elastic annular belt (5); means for positioning said composite moving spokes, suitable for making the moving spokes, upon command, switch from a rest configuration, in which said outer segments are basically arranged inside the perimeter defined by said base, up to a work configuration, in which said outer segments go out of said perimeter and arrange themselves on the tread.

In a preferred embodiment, said moving spoke positioning means comprise a plate, grooved according to a special spiral and coaxially adjacent to the base which it is rotationally coupled with, so that it can be rotated with respect to the base itself. The centripetal ends of the moving spokes comprise a number of projecting pins which engage the special spiral, so as to make the rotation of the plate with respect to the base cause a radial translatory movement of the moving spokes.

The spiral machined in the base is of a special type and features an arc-of-circle-like initial and terminal development; both said arcs of circle cover all sectors of circle defined by the moving spokes, but one.

The moving spokes are of a composite type, i.e. they are made up of a plurality of segments rotationally coupled with each other according to tangential axes, so that the spokes are capable of bending as they progressively move outwards, and embrace the tyre.

In a preferred embodiment of the spokes, the individual segments are enabled to mutually rotate just by the amount strictly necessary to switch from a rest configuration, in which the segments are lined up according to radial directions, to a work configuration, in which the end segments of the moving spokes progressively rotate up to arranging themselves onto the tread, thus forming a straight angle with respect to those segments which are still radially lined up, and vice-versa.

Good results are obtained by using spokes composed of three segments joined to each other by two hinges.

In a particularly complete embodiment, in order to make the rotation of the segments onto the tread easier, torsional elastic means are advantageously used, which are compressed whenever the segments are lined up in their rest position and conversely can extend whenever the segment goes out: the extension of the elastic means is such as to induce and facilitate the rotation of the segment onto the tread.

Possibly, the radial movement of the composite spokes can be fostered by appropriate radial sliding seats machined in the base.

In a preferred embodiment the spokes can be mounted on the base so that each of them forms an angle different from the straight angle with respect to the roadway, so that, when the ends of the moving spokes get in touch with the asphalt, a reaction force is generated which is not vertical, but comprises a horizontal component which fosters the rotation of the segments of the spokes, thus reducing the risk of dead stops while sliding up to the retracted work position and, at the same time, making their folding onto the tread (11) easier.

In this configuration the spokes are arranged according to the directrices of a conical surface and do not lay on the same plane.

Advantageously, the belt is at least partially elastic, so as to be able to vary its own extension when switching between the rest configuration and the work one.

According to a preferred embodiment the annular belt is composed of a plurality of rigid elements, also referred to as claws, elastically connected to each other so as to cover, in the extracted work position, a good part of the surface of the tread. Only a part of said claws is integrally connected to the end segments of the moving spokes, whereas the remaining claws are elastically connected to each other and to the claws integral with the spokes; so, those claws which form the partially elastic belt are arranged alternately, i.e. some of them are integral with the ends of the spokes whereas others are intermediate and are elastically connected to those integral with the spokes.

In order to increase the grip the claws possibly feature appropriate reliefs; in a preferred embodiment they comprise side ridges on the sides which are arranged radially in the rest position; this way in the work configuration these ridges are transversal with respect to the direction according to which the tread moves on the roadway.

The elastic connection between the individual claws can be implemented according to different solutions, for instance by means of elastic ropes or pieces of a flexible interconnection cable which pass through holes specifically made in the side ridges of the claws and whose ends are provided with higher-cross-section terminals, not insertable in said holes; in correspondence with the ends of said pieces of cable coil springs being put on, whose compression exerted by said terminals results in the belt elastically lengthen.

It might occur that, when switching from the retracted rest position to the extracted work position and vice-versa, stresses induced by the roadway make it difficult, or even impossible, the sliding of the moving spokes.

Also, while the vehicle is running, that part of the tyre which gets in contact with the roadbed tends to reduce its own thickness, to subsequently recover it when the same part of the tyre is located in the upper part of the wheel. Surprisingly, the present invention is capable of obviating these drawbacks thanks to the use of specifically developed elastic means integral with the moving spokes.

In a particularly efficient solution, use is made of specially developed definitely innovative elastic cartridges.

In an alternative embodiment, the base can be directly integrated in the rim of the wheel. This embodiment does not use any additional connection device, reduces the overall mass, and makes wheel balancing easier.

In a different embodiment, dampening means are interposed between the base and the rim of the wheel, suitable for allowing a small clearance between the base of the device and the rim of the wheel.

It is also worth to underline that the device according to the present patent application can be arranged both on the outer face and, having properly preset the vehicle, on the inner face of the rim.

The device is operated by rotating the special spiral with respect to the base and this rotation can be induced in different ways, typically through a motor of different types: electric, pneumatic, or other; in another possible embodiment use is made of a device that holds the spiral fixed with respect to the vehicle while the vehicle driver slowly moves forward by making the wheel, hence the rim, rotate.

BRIEF DESCRIPTION OF THE DRAWINGS

FIG. 2 shows 10 the middle part of the device along with the driving device (61), the special spiral shaped guide (6), the projecting pins (7), and the composite moving spokes (4). FIG. 3B illustrates the radially most external part of the device, showing the annular belt (5), the coil springs (52), the claws (55), the piece of flexible interconnection cable (56) and its respective holes (58), the side ridges (57), and the terminals (59) of the piece of cable. In FIG. 3A a better description is given of the elastic operation of the annular belt which, by switching to the active extracted 20 position, allows to space away the claws (55), as indicated by the arrows (F).

Figure 1:
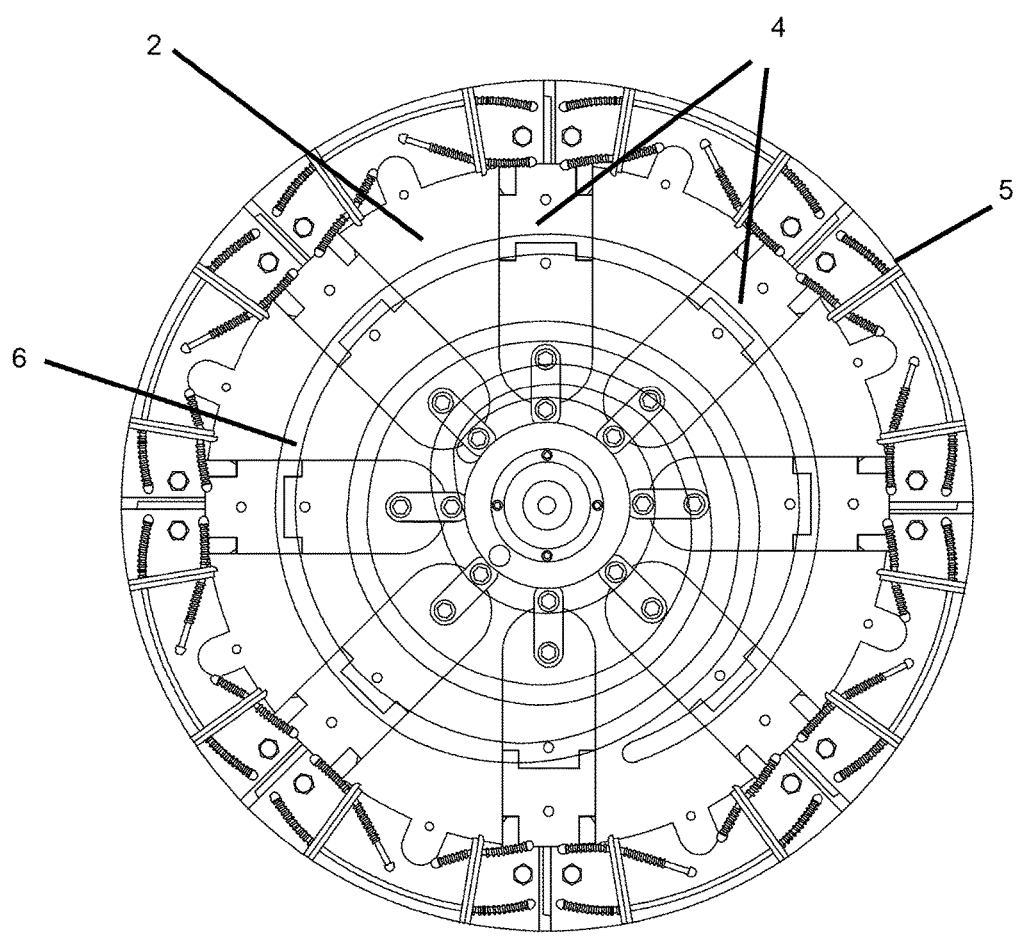
FIG. 1 is a photograph of an embodiment of the invention in its retracted position. Specifically, the figure shows the base (2), the composite moving spokes (4), the annular belt (5), and the special spiral (6); the latter features an arc-of-circle-like initial and terminal development; both said arcs of circle cover all sectors of circle defined by the moving spokes (4), but one.
Figure 2:
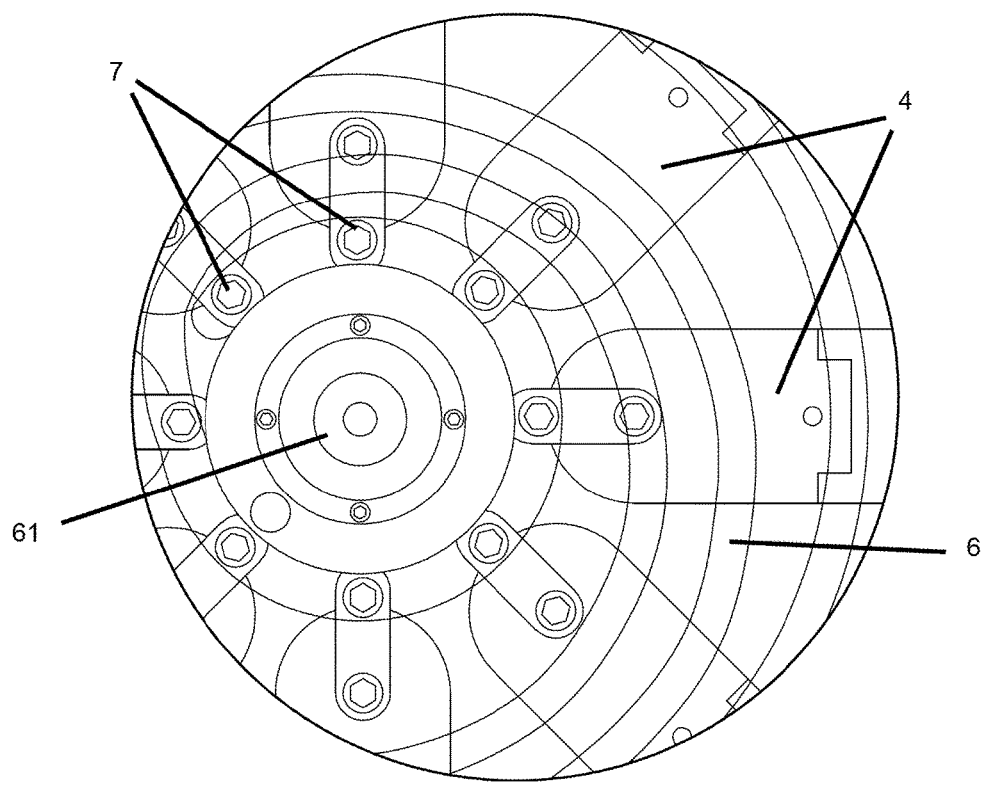
FIGS. 2, 3A and 3B are three details of FIG. 1.

The figures show the base (2), the wheel (10), the tread (11), the outer segment (40), and the inner segment (42) of the composite moving spokes (4), the special spiral (6), the driving means (61), and the projecting pin (7). The translatory movement of the moving spokes is indicated by the arrows (V1 and V2) which their respective rotations (R1 and R2) correspond to.

Figure 6:
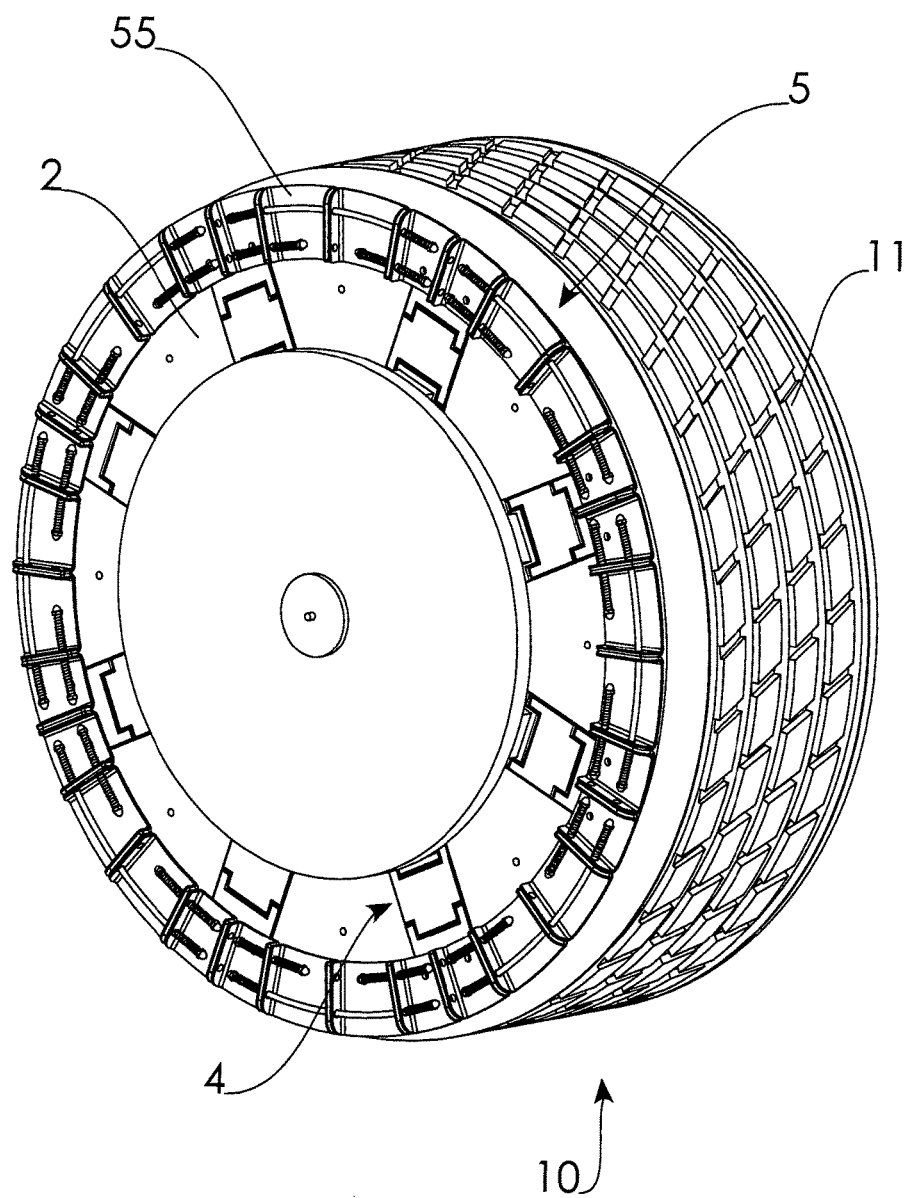

FIG. 6 shows an axonometric view of a wheel (10) on which a particularly complete embodiment of the device according to the present patent application is installed. Said device is represented in its retracted rest position, whereby the tread (11) is free. The figure specifically shows the base (2), the composite moving spokes (4), and the rigid elements (55) of the annular belt (5).

FIGS. 7A and 7B show the same embodiment as FIG. 6, the device being in a position intermediate between the rest one and the work one, i.e. the end segments (40) of the moving spokes being bent onto the tread and rotated about the hinge (41) up to being perpendicular to the intermediate segments (43). The inner segment (42) and the elastic means (8) are also partially visible.

FIG. 8 shows the same embodiment as FIG. 6, the device being in its extracted work position, and the end and intermediate segments (40, 43) of the composite moving spokes being bent and in contact with the tread and the claws (55) provided with side ridges (57) facing outwards, so as to get in contact with the roadway. It is possible to note that the intermediate segment (43) of the moving spokes is rotationally connected to the inner segment (42) via a hinge (41).

Figure 9:
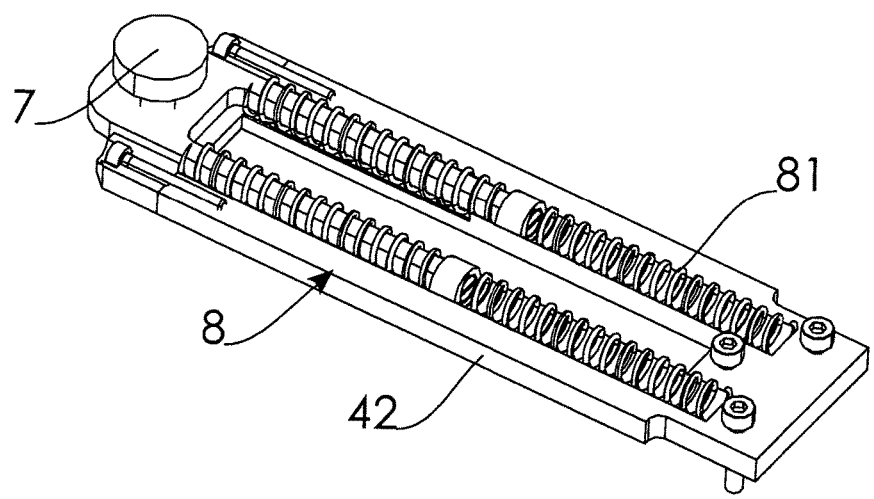

FIG. 9 shows an embodiment of the inner segment (42) of a moving spoke, complete with a spring cartridge (81) which is interposed between the projecting pin (7), which inserts in the groove of the special spiral (6) and the end; the latter is connected, possibly via further segments, to the outer segment (40).

Figure 10:
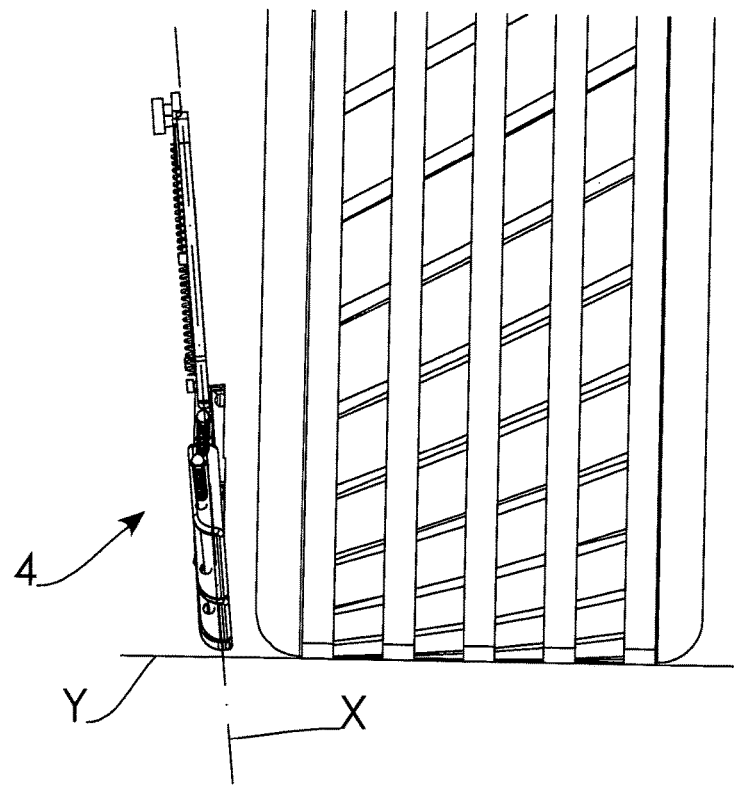

FIG. 10 shows an embodiment of the device according to the present patent application in which the moving spoke, arranged according to the axis (X), forms an angle different from the straight angle with the plane (Y) of the roadway, thus fostering the rotation of the end segment onto the tread. Many segments have been removed in this representation to facilitate its reading.

Figure 11:
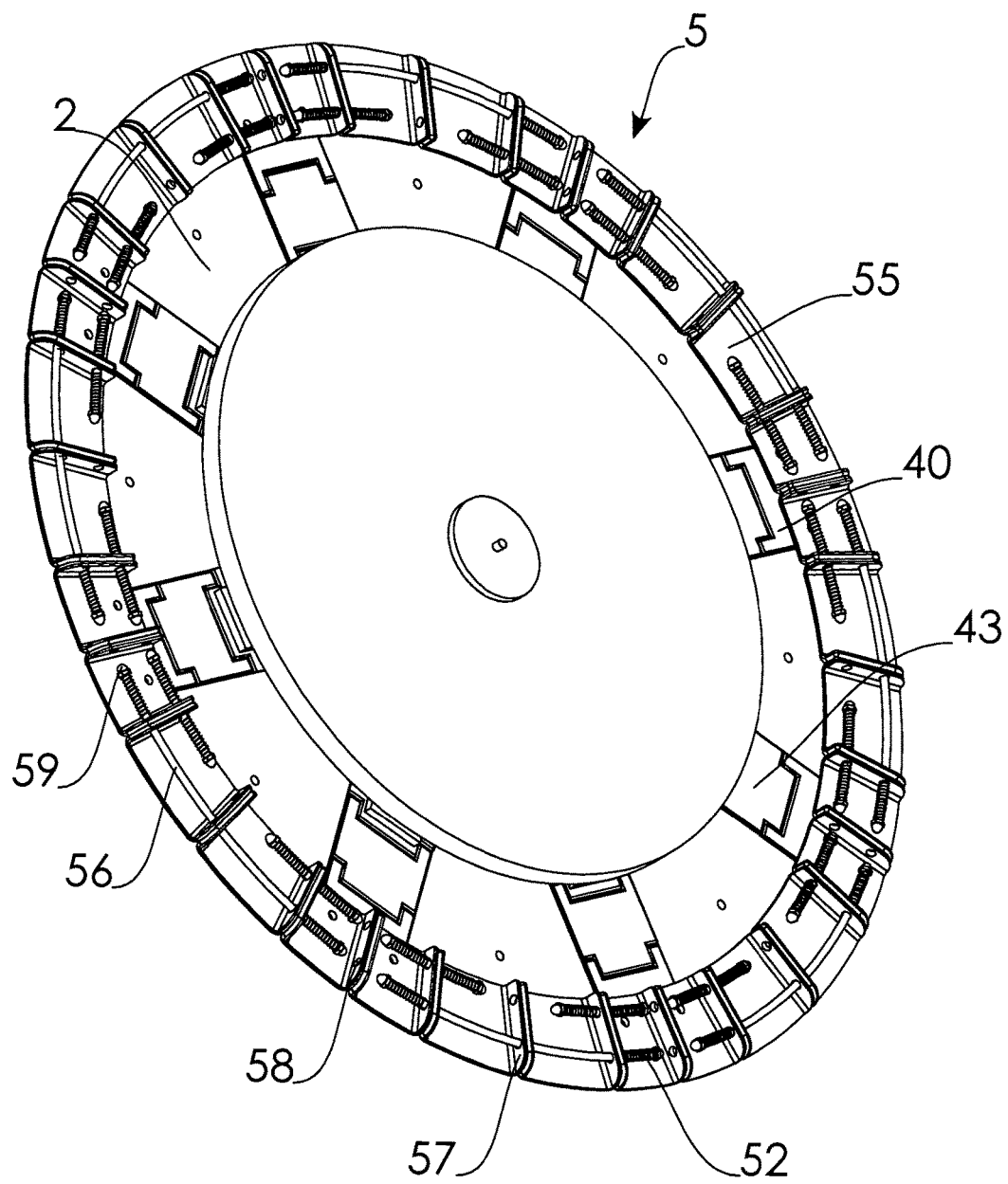

FIG. 11 is a perspective view which allows to better examine the embodiment of FIG. 6 and, in particular, the annulus formed by the annular belt (5) in its retracted rest position.

Figure 12:
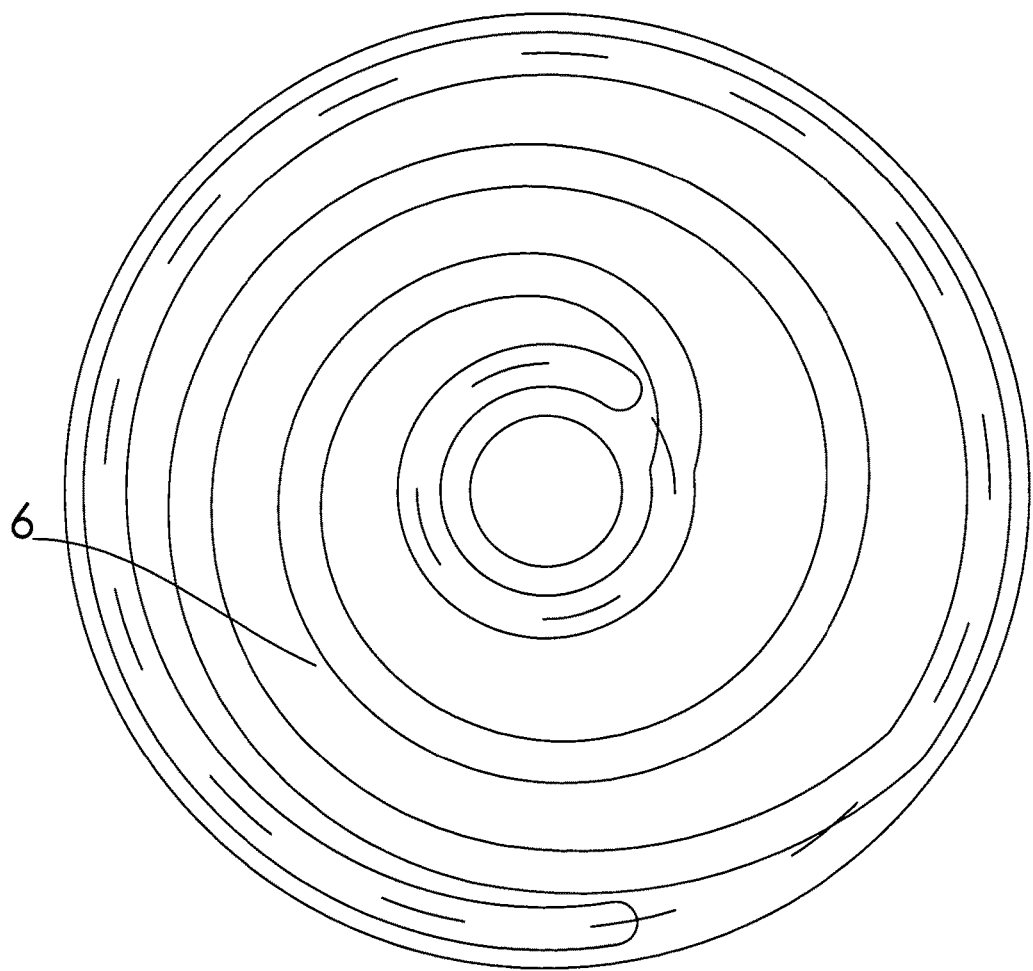

FIG. 12 shows in details the special spiral (6) which features an arc-of-circle-like initial and terminal development; both said arcs of circle cover all sectors of circle defined by the moving spokes, but one.

DETAILED DESCRIPTION OF AN EMBODIMENT OF THE INVENTION

The following detailed description, given for merely explanatory not limitative purposes, with reference to the attached drawings, highlights the further features and the advantages resulting therefrom and are an integral part of the subject invention.

The device according to the present patent application comprises a base (2) provided with means for integrally associating it with one of the faces of a rim of a wheel (10) of a vehicle, of a type equipped with a tyre presenting its respective sides and tread (11).

From said base (2) a plurality of composite spokes (4) radially depart, which radially move being operated by their respective positioning means.

Said base (2) is made reversibly integral with said rim of the wheel (10) by means of appropriate locking means of a known type, for instance the same bolts that secure the rim to an axle or axle shaft of the vehicle, or by means of dedicated screws.

In a particularly functional embodiment, said base (2) can be assembled on said rim through the interposition of appropriate dampening elements, for instance small rubber blocks, suitable for allowing a small clearance between the base and the rim so as to dampen the stresses transmitted to the base (2) by said composite spokes (4) whose ends impact the roadbed.

It is worth to recall that, in a particular embodiment of the invention, said base (2) can also be permanently integrated in the rim of the vehicle.

The outer segments of the composite spokes (4) are connected to each other by a partially elastic annular belt (5), whose extension capabilities make it possible for it to arrange itself around the tyre, up to the tread (11).

Said annular belt (5) is composed of a plurality of claws (55), elastically connected to each other so as to form a variable-diameter annulus.

Let us point out that rigid claws (55) does not mean an absolute non-deformability, but a rigidity just enough to make them different from the elastic parts of the annular belt (5). In this embodiment the claws (55) are formed of metal flat elements of a trapezoidal shape, provided with two projecting side ridge (57), the latter having through-holes (58) which one or several pieces of interconnection cables (56) can pass through.

Figure 3A:
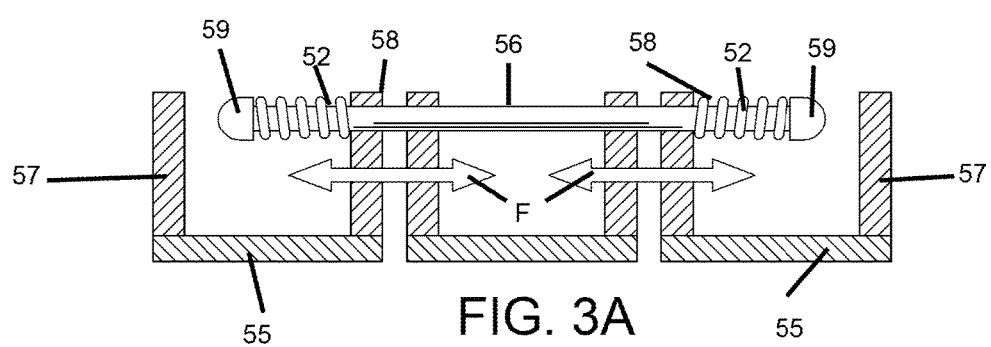
Figure 3B:
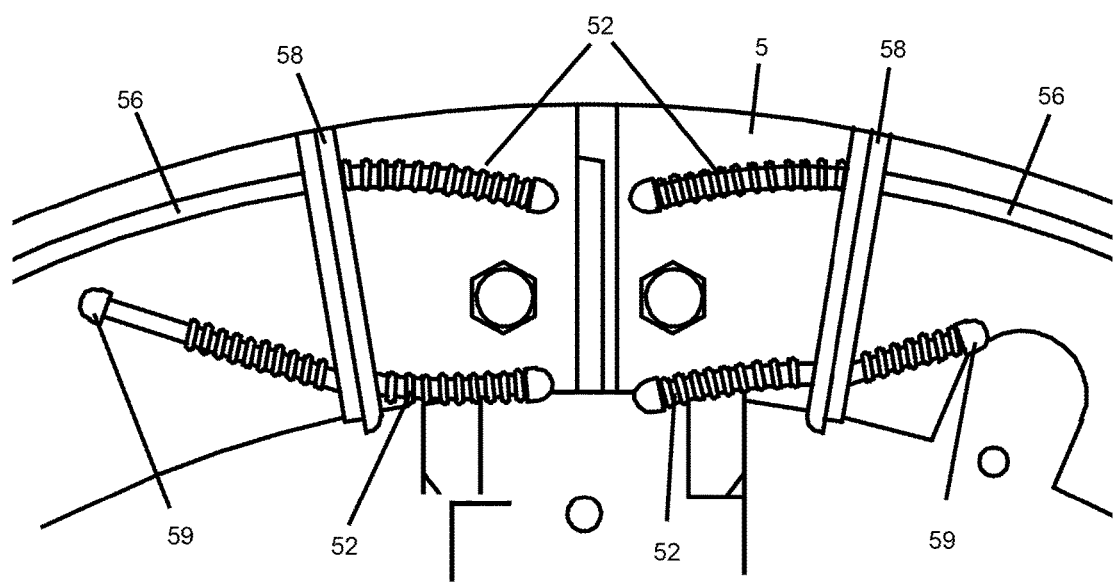
Figure 4A:
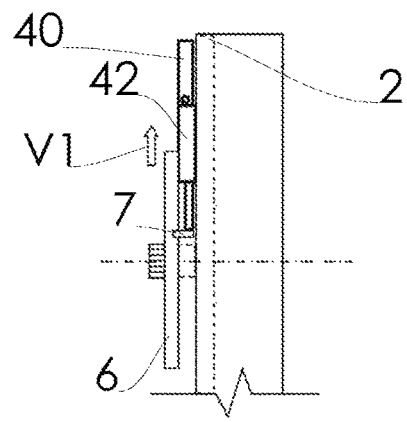
FIGS. 4A, 4B, 4C, 5A and 5B show the functional diagrams of the device according to the present patent application on one end and on one side of the vehicle respectively. The configuration shown in FIG. 4B illustrates the extracted work position whereas the configurations shown in FIG. 5A and 5C illustrate the retracted rest position, before and after extracting the claws respectively.
Figure 4B:
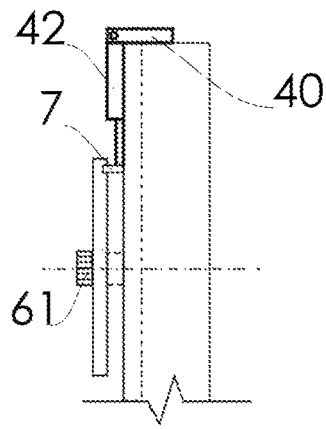
Figure 4C:
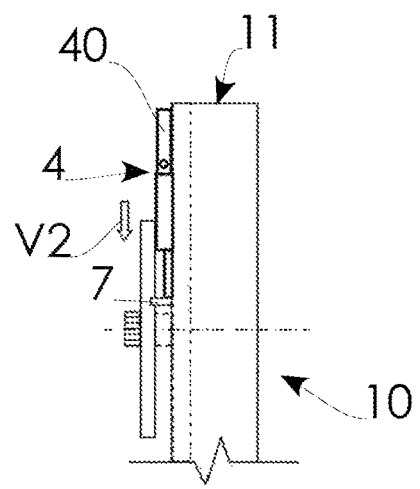

As better visible in the detail in FIGS. 3A and 3B, the elastic elements interconnecting the claws (55) comprise a piece of flexible metal cable (56), whose ends are provided with anti-slip-off lugs or terminals (59).

The cable (56) is inserted within at least one coil spring (52), whose outer diameter is such as to prevent it from passing through the hole (58) and whose inner diameter is such as to prevent the terminal (59) from passing through. In practice, the individual claws (55) going away from each other, as indicated by the arrows (F) in the detail in FIGS. 3A and 3B, cause an elastic shortening of the springs (52), which are compressed between the side of the side ridge (55) and its respective lug (59).

So, said annular belt (5) features a variable extension, in that it can elastically yield so as to extend and cover the tread and subsequently shorten again and restore the rest configuration.

Said means for positioning the composite moving spokes (4) are suitable for making them switch, upon command, from a rest configuration, in which they do not touch the tread (11), the claws (55) being substantially internal to the perimeter defined by the base (2), to a work configuration, in which the claws (55) are arranged beyond said perimeter, and cover some portions of the tread surface, the side ridges (57) being arranged transversally.

Advantageously, the side ridges (57), when the belt (5) is positioned on the tread (11), project towards the roadbed, on the side opposite to the tread, so as to substantially increase the grip, as if they were teeth that interact with the soil.

In a preferred embodiment, said means for positioning the spokes (4) comprise a plate in which a special spiral (6) is cut, which operates as a guide for a plurality of projecting pins (7), each of which respectively projecting from the inner segment (42) of a spoke (4). The projecting pins (7) are parallel to the axis of the wheel and orthogonal with respect to the special spiral (6).

The special spiral (6) can rotate about the base (2) thanks to a driving equipment (61), the latter being, for instance, a self-powered electric motor, or an electric motor powered by the electrical equipment of the vehicle.

In the case of trucks, the driving equipment (61) can use the pneumatic system of the vehicle. Also, a remote control can be used to remotely activate said driving equipment (61), for instance from inside the vehicle, to switch from the retracted rest configuration to the extracted work one and vice-versa.

In an alternative embodiment, said driving equipment (61) comprises means that make said special spiral (6) temporarily integral with the vehicle, thus providing a short relative rotation between the latter and said base (2).

In order to prevent damages, and to improve the operativeness of the device and for the sake of security, the operation of said driving equipment (61) can be controlled by appropriate sensors which detect the stress transmitted to said moving spokes (4) and are capable of triggering whenever the stresses induced by the various movements exceed a predetermined threshold value.

In a first embodiment, the spokes (4) comprise an inner segment (42) which supports the projecting pin (7) inserted into the special spiral guide (6) and an outer segment (40) which is rotationally coupled with the inner segment (42) and is also associated with the annular belt (5) so as to position it on the tread (11) whenever the moving spokes (4) switch from the retracted rest position to the extracted work position.

In a particularly effective embodiment, the folding of the outer segment (40) onto the tread (11) is fostered by the presence of torsional elastic elements, coaxial to said pins (41), which operate between the inner segment (42) and the outer segment (40).

In a preferred embodiment, between the outer segment (40) and the inner segment (42) there is a further intermediate segment (43), rotationally coupled with both said inner and outer segments via hinges which possibly also comprise torsional elastic means, usable to facilitate tyre embracement.

The presence of said intermediate segment (43) makes it possible for the outer segment (40) to reach a position more advanced on the tread.

The spokes (4) can advantageously comprise appropriate elastic and/or dampening means (8) to absorb the loads that might be generated by dead stops, if any, preventing the regular movement of the kinematic mechanism.

In a further preferred embodiment said elastic means (8) are integrated in the inner segment (42) through an elastic cartridge capable of absorbing any shocks due to roughnesses of the roadbed or a poor inflation of the tyres. This cartridge comprises a dampening element composed of two parts slidingly coupled with each other according to a radial axis whose movement is countered by one or several elastic elements possibly coupled with mechanical energy dissipator means.

In a particularly complete embodiment of the invention, said moving spokes (4) can be installed on the base (2) so as to form an angle different from the straight angle with the roadbed, i.e. with the inner segment axially more distant from the plane of the rim than the outer segment is; in this case the special spiral (6) is machined on a conical surface not on a flat surface.

Figure 5A:
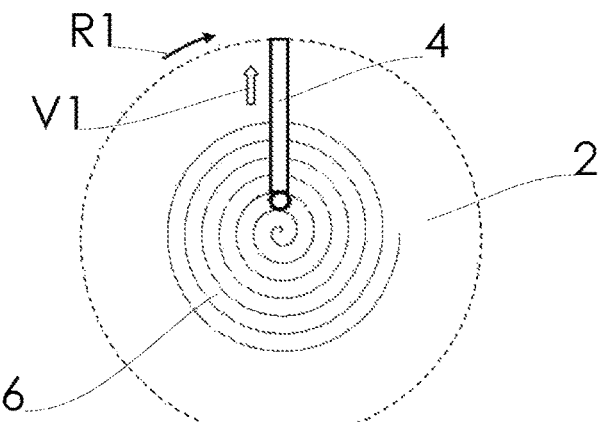
Figure 5B:
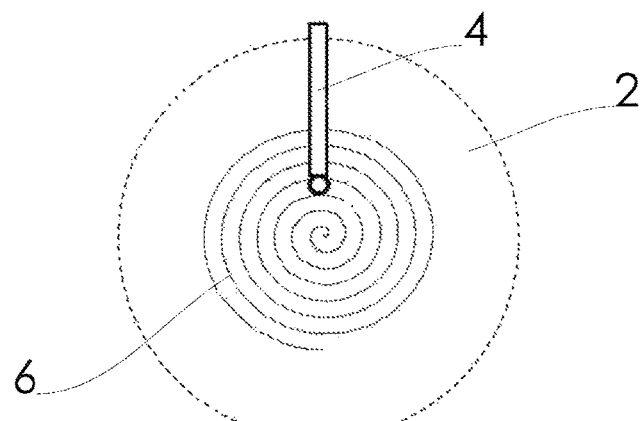
Figure 5C:
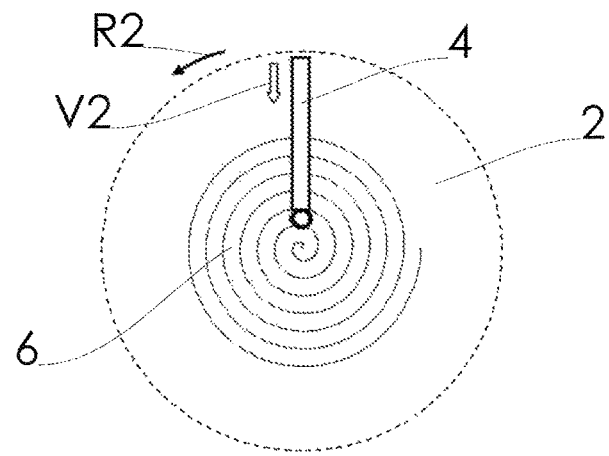

If necessary, it is possible to activate the driving equipment (61) that determines a relative rotation of the disc with the spiral (6) with respect to the base (2). With reference to FIGS. 5A, 5B and 5C, a rotation of the spiral (6), direction indicated by (R1), determines displacement (V1) of the projecting pin spiral (6).

Hence the projecting pin (7) radially pushes the moving spokes (4) outwards, up to reaching the extracted work position of the kinematic mechanism.

Said annular belt (5), by switching from the rest configuration to the work configuration, in which it is arranged on the tread (11), temporarily increases its own length, thanks to the compression of said elastic elements (52) which allow its component claws (55) to be spaced away, as indicated by the arrows (F) in the detail shown in FIGS. 3A and 3B.

Also with reference to FIGS. 5A, 5B and 5C, the recovery of the rest position is determined by a rotation in the opposite direction (R2) of the disc with the spiral (6), which results in a centripetal displacement (V2) of the projecting pins (7) which drive the moving spokes (4) and the annular belt (5) associated with the latter.

The subject device can be advantageously equipped with a covering element, or protection shell, suitable for at least partially enveloping the component parts of the device itself. Also, the component parts of said device, as well as the protection shell, if any, can be made of metal or other materials like rubber or plastic materials.

The invention claimed is:

1. A device to increase the grip of the tread of the wheel of a vehicle comprising:

a base reversibly secured to the outside face of the rim of a wheel of a vehicle, wherein the wheel comprises a tire that contacts a roadbed;

a plurality of adjacent moving spokes each comprising an inner segment and an outer segment, wherein each outer segment is connected to a claw, wherein each claw is elastically connected to an adjacent claw to form a belt having a diameter that increases and decreases upon movement of the moving spokes, wherein further said moving spokes cause, upon command, said belt to switch from a retracted rest configuration having the shape of an annulus in which each moving spoke and claw connected to each respective moving spoke are substantially arranged inside the perimeter of the base and the inner segment and outer segment of each moving spoke are aligned in a radial direction, to an extracted work configuration wherein the outer segment of each moving spoke and the claw connected to each respective moving spoke extend beyond the perimeter of the base such that the outer segment of each moving spoke and the claw connected to each respective moving spoke are perpendicular to the inner segment of each respective moving spoke, wherein the diameter of the belt progressively increases to allow positioning of the belt around the tread of the tire, wherein each of the claws contact the roadbed; and means for positioning the moving spokes between the rest configuration and the work configuration, wherein the means for positioning said moving spokes comprise a plate grooved to form a spiral wherein the plate is rotationally connected to said base, wherein the spiral features an initial and terminal development according to an arc of circle, wherein the inner segment of each moving spoke further comprises a corresponding projecting pin that is inserted in the groove of said spiral so as to radially move each moving spoke in correspondence with rotation of said plate with respect to said base causing each moving spoke to radially translate towards the outer part of the rim of the tire to the extent that each outer segment rotates around said tangential axis until it is positioned on the tread of the tire, thus putting each of the claws in contact with the roadbed, wherein the initial and terminal development arcs of the circle formed by rotation of the spiral cover all but one sector of the circle defined by said moving spokes, wherein the inner segment of each moving spoke is rotationally coupled to the outer segment according to a tangential axis such that the moving spokes bend as the moving spokes radially translate toward the outer part of the rim of the tire.

2. The device of claim 1, wherein each moving spoke further comprises a dampening element which operates in a radial direction to counter the movement of the inner segment and outer segment of each moving spoke, wherein each dampening element is formed of two parts slidingly coupled with each other according to a radial axis whose movement is countered by one or more elastic elements.

3. The device of claim 1, wherein each of said moving spokes further comprises an intermediate segment, interposed between said outer segment and said inner segment, rotationally connected to each of the outer segment and the inner segment according to tangential axes, so that in the extracted active work configuration both said outer segment and said intermediate segment radially translate towards the outer part of the rim of the tire to the extent that each outer segment and intermediate segment rotate around said tangential axes until both the outer segment and intermediate segment are positioned on the tread of the tire, thus putting each of the claws in contact with the roadbed.

4. The device of claim 1, wherein the rotational couplings between the inner segments and outer segments of said moving spokes comprise radial sliding seats machined in the base that facilitate the passing of the inner segments and outer segments of the moving spokes from the retracted rest configuration to the extracted work configuration.

5. The device of claim 1, wherein said moving spokes lay on a conical surface upon which the grooves forming said spiral are machined, so that whenever said moving spokes translate outwards from the contracted rest configuration to the extracted work configuration, the contact of the claws with the road surface generates a force that fosters the folding of the outer segments and claws of the moving spokes onto the tread of the tire.

6. The device of claim 1, wherein the rotation of said spiral with respect to said base takes place through the action of a driving equipment.

7. The device of claim 6, wherein said driving equipment comprises electrical driving equipment.

8. The device of claim 6, wherein said driving equipment comprises pneumatic driving equipment.

9. The device of claim 6, wherein said driving equipment is operated from a remote position.

10. The device of claim 6, wherein the action exerted by said driving equipment stops whenever the stress induced by the roadway on the moving spokes exceeds a predetermined value when the moving spokes are switched from the contracted rest configuration to the extracted work configuration.

11. The device of claim 1, wherein said claws present side projecting ridges suitable for engaging the roadbed in correspondence with the extracted work configuration of the moving spokes.

12. The device of claim 11, wherein said side projecting ridges comprise a plurality of holes crossed through with at least one piece of interconnection cable, wherein the ends of the interconnection cable are equipped with terminals featuring a greater cross-section of a size not insertable into said holes, wherein each end of each interconnection cable is inserted within at least one coil spring, wherein compression of the at least one coil spring caused by a force exerted caused by the movement of the moving spokes from the retracted rest configuration to the extracted work configuration results in an elastic lengthening of said belt.

13. The device of claim 12, wherein one or more of said pieces of interconnection cable with springs comprise intrinsically elastic cables.

* * * * *